Sept. 28, 1937.  G. SLAYTER  2,094,381
DOUBLE GLAZING
Original Filed June 6, 1932
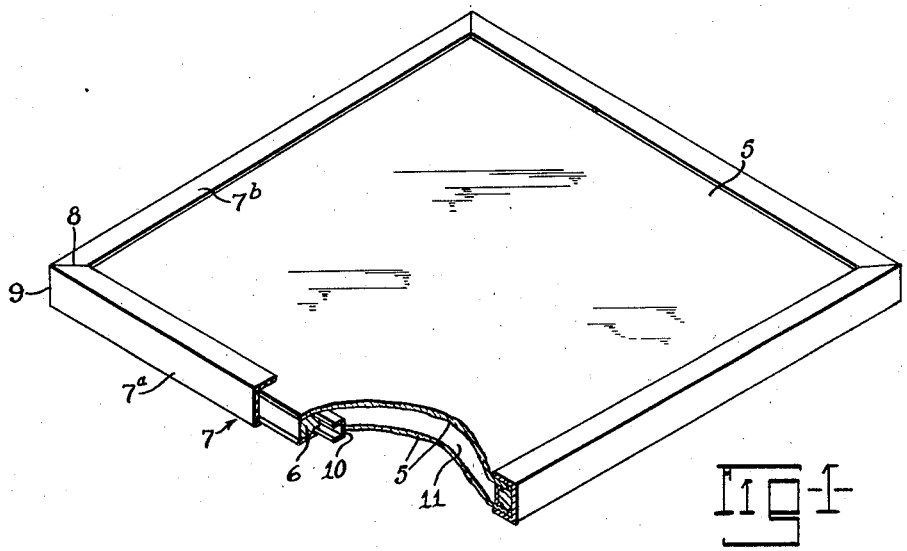
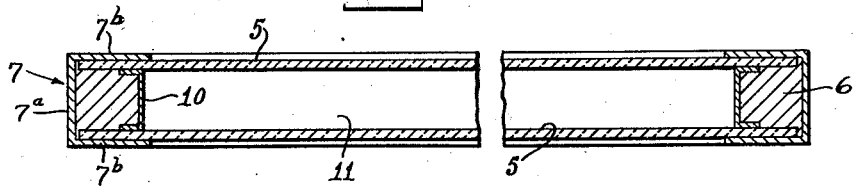
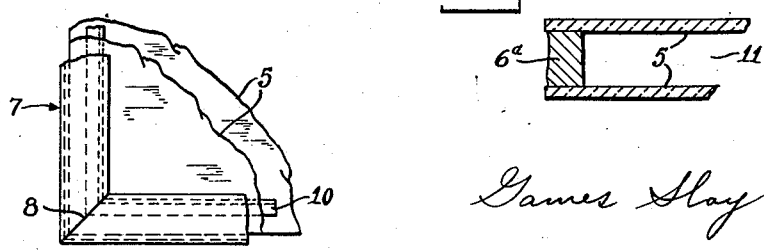
Inventor
James Slayter
By J. F. Rule,
Attorney Patented Sept. 28, 1937

2,094,381

UNITED STATES PATENT OFFICE 2,094,381

DOUBLE GLAZING

Games Slayter, Newark, Ohio, assignor to Owens-Illinois Glass Company, a corporation of Ohio Application June 6, 1932, Serial No. 615,529
Renewed August 13, 1936

4 Claims. (Cl. 20—56.5)

The present invention relates to double glazing in which two parallel flat sheets or panes of glass spaced a short distance apart are secured together along their marginal portions by a suitable material forming a hermetic seal. The invention is adapted for use in windows, doors, partitions, windshields, and in various other situations.

An important requirement of double glazing of the character indicated is that a hermetic seal must be provided which will positively prevent leakage or breathing under all weather conditions and temperature variations to which the article is subjected while in use. An object of the invention is to provide an article which will meet this requirement in a satisfactory manner.

Attempts which have heretofore been made to produce double glazing of this character have not proved satisfactory. One difficulty which has been encountered is due to the fact that in use there is considerable relative expansion and contraction of the two sheets of glass caused by temperature changes and the wide differences in the relative temperatures to which the sheets are subjected. The expansion and contraction due to temperature changes places a strain on the sealing material, particularly as the sheets of glass must be spaced only a short distance apart, usually ¼" or less, so that the lateral or shearing stress at the periphery of the sheets is very high. Attempts to solder, weld or seal with a hard material have failed because of this stress. Attempts to seal with a more pliable material such as rubber have also failed because the sealing materials which have been tried out have been found to oxidize, dry out or otherwise deteriorate in a manner to render them ineffective.

An object of the present invention is to overcome the above noted difficulties by the provision of a construction including a sealing material which meets the following requirements, namely, that it will securely adhere to the glass, will effectively operate as a seal and prevent leakage under all working conditions, will have sufficient ductility and elasticity to accommodate the relative expansion and contraction of the connected sheets of glass due to temperature variations, which at the maximum temperatures to which it is subjected will not be too soft and which, at minimum temperatures, will not crystallize or become brittle, and which may be used over a long period of time without deterioration.

A further object of the invention is to provide a suitable metal frame for lining the sealing material and protecting it from oxidation and also for protecting the edges of the glass during shipping and handling and which, moreover, allows the glass to be attached in a window frame or other frame in such a manner that the sheets of glass themselves can expand and contract in their supporting frame with sufficient freedom to avoid temperature stress.

A further object of the invention is to provide an article of the character indicated having a high insulating value. As it is impractical to maintain a high vacuum between the two sheets of glass, owing to the great strain under which they would be placed by atmospheric pressure, the present invention provides for sealing between the glass sheets, a gas having high insulating value. The pressure of this gas, owing to temperature changes, will vary. In accordance with the present invention, the gas is somewhat rarefied, so that the pressure between the glass sheets is at all times at least slightly less than atmospheric pressure.

When the temperature is low, the external pressure relative to that between the sheets is increased. An object of the invention is the provision of suitable means supplemental to the sealing material for relieving the sealing material of such increased pressure and maintaining the proper spacing between the sheets. Such means may comprise a metal strip which also serves as a protective covering for the inner surface of the sealing material.

Other objects of the invention will appear hereinafter.

In the accompanying drawing:

Fig. 1 is a perspective view with parts broken away showing the article constructed in accordance with the present invention.

Fig. 2 is a sectional elevation of the same.

Fig. 3 is a fragmentary plan view showing one corner of the article.

Fig. 4 is a fragmentary sectional view of a modification in which a soft metal forms the sealing material.

Referring to the drawing, there is shown a composite structure comprising two parallel flat sheets or panes of glass 5 spaced a short distance apart. A gasket or liner 6 of sealing material is secured to the inner faces of the sheets along their marginal portions, so that a hermetically sealed chamber 11 is provided. The sealing material 6 may consist of a bituminous asphalt cement. I have found that the Standard Oil Company's No. 6277 Asphalt Cement, otherwise known as Sohio Petroleum Asphalt No. 6277, is well adapted for the purposes of the present invention. The specifications of this material are as follows:

| | |
|---|---|
| Specific gravity | .98 |
| Melting point (ball and ring) | 180–200 |
| Flash (open cup) | 500° F. |
| Penetration @ 77° F. 100 grams 5 seconds | 20–30 |
| Penetration @ 115° F. 50 grams 5 seconds | Maximum 60 |
| Penetration @ 32° F. 200 grams 60 seconds | Minimum 8 |
| Loss on heating 50 grams 5 hours @ 325° F. max | .2% |
| Total bitumen CS-2 | 99.8% |

The sealing material 6 may be applied to the glass while said material is in a hot plastic condition, or the contacting surfaces of said material and the glass may be heated sufficiently to soften the sealing material and cause it to firmly adhere to the glass. If desired, a solvent may be used for softening the surface of the sealing material to cause it to adhere to the glass. I have found that the asphalt cement above specified will adhere very securely to the glass and positively prevent air leakage or breathing under the wide range of temperature conditions and changes to which the invention is ordinarily subjected while in use. The cement is sufficiently ductile and elastic to accommodate itself to the uneven expansion and contraction of the two sheets of glass which occurs when the glazing is exposed to the weather. Thus, for example, if used in a window, the outer sheet may at times be subjected to sub-zero temperatures while the inner sheet is exposed to the temperature of a warm room. The flexibility of the sealing material permits it to readily accommodate itself to the lateral movement of one sheet of glass relative to the other which takes place under such temperature variations.

As a protection to both the sealing material and the edges of the glass sheets, a frame 7 is provided which surrounds and covers the margins of the sheets and the interposed sealing material 6. The frame 7 may be made up of four strips of sheet metal, one extending along each edge of the article. Each said strip comprises a vertical portion 7ª overlying and covering the outer surface of the sealing gasket 6, and horizontal flange portions 7ᵇ overlying and underlying the marginal portions of the upper and lower sheets 5, respectively. The beveled ends of the flanges 7ᵇ meet in diagonal lines 8 at the corners of the frame. The ends of the frame parts 7ª meet at the corners of the frame in vertical lines 9. The frame pieces may be soldered together along the seams 8 and 9, thereby uniting them into a unitary structure, securely held in place on the glass. The frame 7 protects the exterior surface of the sealing material 6 from exposure to the outside air and thus from any tendency to oxidation, and also protects it from mechanical injuries.

The metal frame further serves as a protection for the edges of the glass sheets, preventing chipping or breakage. It also materially assists in mounting the glazing in a framework in a manner to permit expansion and contraction without applying stresses to the glass. It will be observed that sufficient clearance is provided between the frame parts 7ª and the edges of the glass to permit expansion and contraction without applying any stresses on the glass or frame. The flange portions 7ᵇ bear with a yielding pressure against the glass, maintaining a close fit at all times while permitting expansion and contraction without any strain on the parts.

An inner spacing strip or spreader 10 is preferably provided to extend along the entire inner surface of the sealing gasket 6. The spacing strip 10 which may also be made of sheet metal, is preferably channel-shaped in cross section as shown. It comprises a vertical body portion covering the inner face of the gasket 6 and end flange portions bent at right angles to said body portion, said flange portions lying against the inner faces of the glass sheets and preferably embracing a portion of the sealing gasket. The spacing strip 10 serves to hold the sheets 5 properly spaced apart and prevents the sealing material 6 from collapsing or squeezing out of shape, as might otherwise take place if such material, while in use, were softened by high temperatures and subjected to external pressure. The strip 10 also protects the sealing material from exposure to air or other gas within the chamber 11 and thus insures against oxidation or other detrimental reaction of the gas on said material.

In order to increase the heat insulating properties, the chamber or space 11 between the sheets 5 may be filled with a gas having high insulating value. As the conductivity of a gas varies inversely with its molecular weight, I preferably use a gas having a higher average molecular weight than air. Carbon dioxide is found to give good results and, as compared with air, materially increases the effectiveness of the article as a heat insulator. The gas in the chamber 11, whether air or some other gas, is preferably somewhat rarefied so that atmospheric pressure operates at all times to place the sealing material under more or less compression. The net pressure evidently will vary with temperature changes, increasing with a reduction in temperature which reduces the pressure of the gas within the chamber 11.

Other material than the petroleum asphalt above described may in some instances be used for the sealing gasket 6. For example, rubber or a rubber compound may be vulcanized to the glass to provide a hermetic seal for the chamber 11. The frame 7 and spreader 10 cooperates with the glass to protect the gasket on all sides from exposure to the oxidizing influences of the air so that the gasket is not subject to the usual rapid oxidation or deterioration that has heretofore rendered such material impractical as a sealing material for double glazing.

Fig. 4 illustrates a modification in which the two panes of glass 5 are hermetically sealed together with a soft metal or flexible cement 6ª that is stiff enough to hold its shape without auxiliary supporting means such as the frame 7 and spacer 10 shown in the other figures, and is at the same time flexible enough to allow for expansion and contraction of the parts.

Various modifications other than those herein described may be resorted to within the spirit and scope of my invention.

What I claim is:

1. A composite article comprising parallel rectangular sheets of flat glass spaced a short distance apart, a sealing material interposed between said sheets and extending along the marginal portions thereof, said material adhering to the opposite inner faces of the sheets and forming with said sheets a hermetically sealed chamber, and a sheet metal strip extending along the margins of the sheets, bridging the space therebetween and forming a cover for the exterior surface of the sealing material, said sealing material consisting of a petroleum asphalt which is ductile and elastic at subzero temperatures and which has a melting point above 150 degrees F.

2. A composite article, comprising parallel sheets of flat glass spaced apart, a sealing gasket extending along and secured to the marginal portions of said sheets and forming therewith a hermetically sealed chamber, said sealing gasket consisting of a petroleum asphalt which is ductile and elastic at subzero temperatures and which has a melting point above 150° F., and carbon dioxide gas filling said chamber.

3. A composite article, comprising parallel sheets of flat glass spaced apart, a sealing gasket extending along and secured to the marginal portions of said sheets and forming therewith a hermetically sealed chamber, said sealing gasket consisting of a petroleum asphalt which is ductile and elastic at subzero temperatures and which has a melting point above 150° F., and a rarefied gas filling said chamber, said gas having a molecular weight greater than that of air.

4. A composite article, comprising parallel sheets of flat glass spaced apart, a sealing gasket extending along and secured to the marginal portions of said sheets and forming therewith a hermetically sealed chamber, said sealing gasket consisting of petroleum asphalt which is ductile and elastic throughout a range of temperatures from 0° F. to 100° F. and carbon dioxide gas filling said chamber.

GAMES SLAYTER.